2,839,414

LOW LOSS CERAMIC INSULATORS

Robert D. Fenity, Cameron G. Harman, and Eugene Wainer, Cleveland, Ohio, assignors to The Star Porcelain Company, Trenton, N. J., a corporation of New Jersey No Drawing. Application August 11, 1955
Serial No. 527,868

1 Claim. (Cl. 106—46)

This invention relates to ceramic bodies and in particular to ceramic bodies useful as low loss insulators.

Ceramic electrical insulators are of two types: those in which electrical capacity is of prime consideration, and those in which the insulating properties are of first importance. The present disclosure deals with the latter type, generally classed as low loss insulators. The quality of a low loss insulator is measured by a quantity termed the loss factor. This factor is the arithmetical product of the dielectric constant times the dissipation factor of the vitrified ceramic. The dielectric constant is the ratio of the capacity of the insulator to the capacity of a vacuum of the same dimensions. The dissipation factor is a measure of the amount of electrical power lost from leakage or any other power consuming process in the ceramic. The product of these two figures is proportional to the total electrical losses due to the insulator.

Low loss insulators are ordinarily classified according to the Army-Navy Specification JAN–I–10, dated April 29, 1944, as amended through January 23, 1953, which sets up the following grades:

| Grade | L–1 | L–2 | L–3 | L–4 | L–5 | L–6 |
|---|---|---|---|---|---|---|
| Loss factor | 0.150 | 0.070 | 0.035 | 0.016 | 0.008 | 0.004 |

Loss factors for this classification are measured at a frequency of one megacycle per second after the samples have been soaked for 48 hours in distilled water at room temperature.

Many types of ceramic low loss insulators are in commercial production fulfilling the various needs for electrical, thermal and strength properties. These are usually identified by the major crystalline phase present such as steatite, forsterite and alumina. Although they may be composed of a variety of materials, all are manufactured by the same general ceramic techniques. The raw materials are usually high grade minerals, and are mixed in the proportions desired, in some cases with organic binders and plasticizers, and an amount of water suitable for the method of forming used. The piece is formed by ceramic casting, extrusion or pressing techniques and the water is then thoroughly removed by heating at low temperatures. The pieces are fired in kilns and vitrified at maturing temperatures which ordinarily may range for various types of products from 2000° F. to 3000° F. After cooling, the insulators are ready for use in the electrical equipment for which they were designed. After firing, most low loss insulators have zero porosity and very smooth surfaces, both characteristics which are necessary for low electrical loss under humid conditions. Some insulators are glazed to improve the surface properties.

Perhaps the most popular low loss, high frequency insulators are those in which steatite is the major crystalline phase. The principal raw material for this type of body is a special talc with 10 to 15 percent clay added for plasticity, and 5 to 15 percent barium carbonate included to increase the aging stability. Other components may also be added. This general type of insulator falls into the L–4 or L–5 class and is fired in the general range from 2250° to 2350° F.

One disadvantage to making low loss insulators from steatite is the extremely short temperature range, usually about ±10° F., over which these bodies mature or become nonporous. Below this general range, porosity remains, giving rise to high loss factors, while above the upper limit, blistering and deformation of the pieces occur. Commercially, it is difficult to control kiln temperatures closely enough to avoid a high percentage of badly fired ware. A large proportion of defective bodies increases production costs. Moreover, extremely close control of the composition of the talc and other raw materials is required to consistently produce L–5 insulators. Steatite also has poor thermal shock resistance.

For these reasons there has been a strong interest and need in the industry for a more easily produced low loss insulator composition with electrical and physical properties equal to or better than those of steatite.

According to the invention, these needs are met by means of a ceramic insulator consisting essentially of crystalline wollastonite and a glass phase.

Preferably crystalline wollastonite will comprise between about 50% and about 80%, usually about 55 to 70% by weight of the body. The body will preferably have the following oxide analysis, the proportions being by weight:

| | Percent |
|---|---|
| $SiO_2$ | 45 to 55 |
| $CaO$ | 28 to 38 |
| $Al_2O_3$ | 2 to 10 |
| $TiO_2$ | 1 to 8 |
| $PbO$ | 3 to 13 |

Insulators having the compositions described can be made in the L–4 or L–5 grades, with good thermal shock resistance and a firing range on the order of ±40° F.

Wollastonite is calcium metasilicate ($CaO.SiO_2$). It occurs nearly pure in nature, is readily available on the market and is relatively inexpensive. In making up the batch from which bodies according to the invention are formed, wollastonite preferably comprises between about 50% and about 75% on the weight of the air dry batch.

The other ingredients which are present in the fired body may be added in various forms to the batch before firing. Alumina may be added as clay, preferably as a beneficiated ball clay such for example as Kentucky Old Mine #4, which has the following analysis:

| | | |
|---|---|---|
| Silica | Weight percent | 51.65 |
| Alumina | do | 31.24 |
| Titanium oxide | do | 1.72 |
| Iron oxide | do | 1.17 |
| Calcium oxide | do | .20 |
| Magnesium oxide | do | .50 |
| Potassium oxide | do | .36 |
| Sodium oxide | do | .58 |
| Ignition loss | percent | 12.13 |

When used, ball clay is preferably present in an amount between about 10% and about 27% by weight of the dry batch. Additional calcium above that added as wollastonite and clay may be obtained by the addition of, for example, the carbonate $CaCO_3$. When calcium carbonate is used, it will preferably comprise between about 5% and about 25% by weight of the dry batch.

Titania is preferably added as $TiO_2$ and the lead oxide preferably as lead bisilicate, a fritted lead silicate having an approximate composition (percent by weight):

| | Percent |
|---|---|
| $PbO$ | 65 |
| $SiO_2$ | 33 |
| $Al_2O_3$ | 2 |

When titania is used, it will preferably comprise between about 1% and about 10% by weight of the dry batch. Lead bisilicate when used will preferably comprise between about 3% and about 15% by weight of the dry batch.

Silica in excess of that added as wollastonite clay or lead bisilicate may be added, for example, as powdered quartz or potter's flint. When used, the flint or quartz will comprise up to 5% by weight of the dry batch.

The term "dry batch" is used to indicate the batch before a vehicle or binder is added.

In forming articles from compositions according to the invention, the materials are reduced to a finely divided form, preferably to a particle size through about 200 mesh, usually to through about 325 mesh and are mixed in either the wet or dry state. They are then shaped by known ceramic techniques, for example by extrusion, pressing or casting.

To aid in shaping the mixture a suitable quantity of a vehicle, or of a vehicle with a binder may be used. The vehicle may be simply water, or it may be an organic liquid of the type customarily used by the art.

If a binder is used, it may be selected from those organic binders well known to the art.

The shaped article with or without vehicle or binder is dried in the conventional manner and fired.

Firing is done at a temperature between about 2000° F. and about 2300° F., preferably between about 2100° F. and about 2200° F., in an oxidizing atmosphere. The firing time is variable, depending on the particular composition and the size of the article being fired. Usually it will range between about 8 and about 24 hours.

During the firing operation a liquid is formed, which remains as a glass in contact with the crystalline wollastonite. The firing temperature, composition and firing time are adjusted within the ranges set forth, to obtain this result.

After firing, the bodies are kiln-cooled to room temperature.

The invention will be further described by the following specific examples. It will be understood that these examples are given for purposes of illustration only, and are not to be taken as in any way restricting the invention beyond the scope of the appended claims.

EXAMPLE I

A batch was made up using the following ingredients:

| Component: | Weight percent |
|---|---|
| Wollastonite ($CaO \cdot SiO_2$) | 60.2 |
| Ball clay | 12.7 |
| $CaCO_3$ | 3.1 |
| $TiO_2$ | 2.2 |
| Potter's flint | 5.3 |
| Lead bisilicate | 16.5 |
| | 100.0 |

The ingredients were ball milled to a particle size through 325 mesh, mixed with water to permit shaping and formed in the shape of a disc. They were then dried at about 230° F., fired at a temperature of about 2100° F., in air, and then kiln-cooled.

Analysis of the finished articles showed the following oxide compositions, the percentages being by weight:

| | Percent |
|---|---|
| $SiO_2$ | 50.8 |
| $CaO$ | 31.4 |
| $Al_2O_3$ | 4.2 |
| $TiO_2$ | 2.3 |
| $PbO$ | 11.3 |
| | 100.0 |

The loss factor of the sample disc was determined as 0.0056 at 100 kc. and 0.0051 at 1 mc. The firing range was found to be ±40° F.

EXAMPLES II to XI

Examples II to XI were carried out in the manner described in connection with Example I. The particulars of these examples are given in the table below, the percentages being by weight. The firing range for all of the compositions given in Examples II to XI was between about ±30° F. and about ±40° F.

Table

| Example | II | III | IV |
|---|---|---|---|
| Batch Composition, Percent: | | | |
| Wollastonite | 50.7 | 66.3 | 71.7 |
| Ball Clay | 26.0 | 12.8 | 9.5 |
| $CaCO_3$ | 9.4 | 3.8 | 2.5 |
| $TiO_2$ | 6.6 | 2.6 | 1.8 |
| Potter's Flint | 1.8 | 3.5 | 3.5 |
| Lead Bisilicate | 5.5 | 11.0 | 11.0 |
| Firing Temp., °F | 2,200 | 2,150 | 2,200 |
| Fired Composition, Percent: | | | |
| $SiO_2$ | 47.5 | 50.5 | 51.0 |
| $CaO$ | 32.2 | 35.0 | 36.6 |
| $Al_2O_3$ | 9.0 | 4.2 | 3.1 |
| $TiO_2$ | 7.3 | 2.8 | 1.9 |
| $PbO$ | 4.0 | 7.5 | 7.4 |
| Loss Factor, 100 kc | 0.0127 | 0.0039 | 0.0054 |

| Example | V | VI | VII | VIII |
|---|---|---|---|---|
| Batch Composition, Percent: | | | | |
| Wollastonite | 60.0 | 60.0 | 60.0 | 55.5 |
| Ball Clay | 15.0 | 15.0 | 15.0 | 19.3 |
| $CaCO_3$ | 5.0 | 10.0 | | 6.3 |
| $TiO_2$ | 5.0 | 5.0 | 5.0 | 4.4 |
| Potter's Flint | 5.0 | | 10.0 | 3.5 |
| Lead Bisilicate | 10.0 | 10.0 | 10.0 | 11.0 |
| Firing Temp., °F | 2,100 | 2,175 | 2,125 | 2,125 |
| Fired Composition, Percent: | | | | |
| $SiO_2$ | 49.9 | 45.6 | 53.9 | 48.6 |
| $CaO$ | 32.9 | 36.7 | 29.2 | 32.6 |
| $Al_2O_3$ | 5.0 | 5.1 | 4.9 | 6.4 |
| $TiO_2$ | 5.3 | 5.5 | 5.2 | 4.7 |
| $PbO$ | 6.9 | 7.1 | 6.8 | 7.7 |
| Loss Factor, 100 kc | 0.0092 | 0.0083 | 0.0038 | 0.0041 |
| Loss Factor, 1 mc | | | | 0.0048 |
| Loss Factor, 10 mc | | | | 0.0054 |
| Loss Factor, 35 mc | | | | 0.0068 |

| Example | IX | X | XI |
|---|---|---|---|
| Batch Composition, Percent: | | | |
| Wollastonite | 57.4 | 56.5 | 58.5 |
| Ball Clay | 16.7 | 17.9 | 15.1 |
| $CaCO_3$ | 5.0 | 5.7 | 4.4 |
| $TiO_2$ | 3.5 | 4.0 | 3.1 |
| Potter's Flint | 4.2 | 3.8 | 4.5 |
| Lead Bisilicate | 13.2 | 12.1 | 14.3 |
| Firing Temp., °F | 2,125 | 2,125 | 2,100 |
| Fired Composition, Percent: | | | |
| $SiO_2$ | 49.9 | 49.4 | 49.5 |
| $CaO$ | 31.6 | 31.9 | 32.1 |
| $Al_2O_3$ | 5.6 | 6.0 | 5.0 |
| $TiO_2$ | 3.7 | 4.3 | 3.3 |
| $PbO$ | 9.2 | 8.4 | 10.0 |
| Loss Factor, 100 kc | 0.0091 | 0.0064 | 0.0064 |

What is claimed is:

A ceramic low loss insulator body consisting essentially of from about 50 to about 80% by weight crystalline wollastonite and a glass phase and having a fired composition consisting essentially of between about 45% and about 55% by weight $SiO_2$, between about 28% and about 38% $CaO$, between about 2% and about 10% $Al_2O_3$, between about 1% and about 8% $TiO_2$ and between about 3% and about 13% $PbO$.

References Cited in the file of this patent

UNITED STATES PATENTS 2,726,963    Jackson _____ Dec. 13, 1955